(12) United States Patent
Geller et al.

(10) Patent No.: US 11,096,018 B2
(45) Date of Patent: Aug. 17, 2021

(54) MESSAGE MANAGEMENT AND CONDITIONAL DELIVERY OF AVAILABLE MESSAGES

(71) Applicant: Time Warner Cable Enterprises LLC, New York, NY (US)

(72) Inventors: Steven I. Geller, Kensington, MD (US); Mark L. Rolufs, Fairfax, VA (US); Young Noble, Fairfax, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 672 days.

(21) Appl. No.: 14/320,942

(22) Filed: Jul. 1, 2014

(65) Prior Publication Data

US 2016/0007171 A1 Jan. 7, 2016

(51) Int. Cl.
*H04W 4/12* (2009.01)
*G06Q 30/02* (2012.01)
*H04W 4/029* (2018.01)

(52) U.S. Cl.
CPC .......... *H04W 4/12* (2013.01); *G06Q 30/0261* (2013.01); *H04W 4/029* (2018.02)

(58) Field of Classification Search
CPC .......... H04W 4/12; H04W 4/02; H04W 8/26; H04W 8/18; G06Q 30/0261
USPC ......... 455/456.1, 456.2, 456.3, 456.4, 456.5, 455/456.6, 457
See application file for complete search history.

(56) References Cited

U.S. PATENT DOCUMENTS

| | | | |
|---|---|---|---|
| 2007/0055672 A1* | 3/2007 | Stevens | G06F 17/3087 |
| 2007/0055684 A1* | 3/2007 | Stevens | H04W 76/007 |
| 2010/0005523 A1* | 1/2010 | Hassan | G06F 21/31 726/19 |
| 2010/0056113 A1* | 3/2010 | Silverman | H04M 3/533 455/413 |
| 2011/0092221 A1* | 4/2011 | Zubas | H04M 1/72547 455/456.1 |
| 2013/0143586 A1* | 6/2013 | Williams | G06Q 30/0261 455/456.1 |
| 2014/0195626 A1* | 7/2014 | Ruff | H04L 63/104 709/206 |
| 2015/0234868 A1* | 8/2015 | Lavalaye | G06F 17/30312 707/812 |

* cited by examiner

*Primary Examiner* — Charles N Appiah
(74) *Attorney, Agent, or Firm* — Armis IP Law, LLC

(57) ABSTRACT

A message-processing resource receives location information indicating a current location of a mobile device in a network. A user of the mobile device subscribes to use of the network. The message-processing resource maps an identity of the user to a subscriber account and candidate messages associated with the user. The message-processing resource utilizes the location information to identify a message pertinent to the user and the current location of the mobile device. The message-processing resource selects the message from the candidate messages and provides notification of the selected message to the user of the mobile device.

27 Claims, 10 Drawing Sheets

MESSAGE FILTER INFORMATION
770

FOR SUBSCRIBER 108-1:

PLEASE SELECT THE FOLLOWING TYPE OF MESSAGES IN WHICH
YOU WOULD LIKE TO BE NOTIFIED OF EVENTS:

[X] NOTIFY ME WHEN I AM NEAR A TWC WIFI HOTSPOT AND I AM USING A NON-TWC A.P.

[X] NOTIFY ME WHEN I AM NEAR BUSINESS TYPE XYZ

[X] NOTIFY ME WHEN MY HOUSE IS BEING BURGLARIZED

[ ] NOTIFY ME WHEN PPV BOXING IS AVAILABLE

[ ] NOTIFY ME WHEN I AM NEAR A GROCERY STORE AND NEED GROCERIES

[X] NOTIFY ME WHEN MY CABLE SERVICES BILL IS DUE

MESSAGE MANAGEMENT AND CONDITIONAL DELIVERY OF AVAILABLE MESSAGES

BACKGROUND

Conventional RF (Radio Frequency) technology has been used for many years to connect wireless devices such as phones, laptops, etc., to a landline network and/or other wireless networks. Today, RF technology supports many different types of connection services such as voice communications, high-speed data services, WiFi™ connectivity, and so on.

One type of mature RF technology is cellular network technology. Conventional cellular network technology typically includes an expansive land area that has been divided into so-called cells or cellular regions. A single cellular base station typically resides in each cell. The single cellular base station typically provides coverage over multiple square miles of land. Often, a base station in a respective cell is connected to a landline network. Via wireless communications between the respective cell phone and cell phone base station, the wireless subscriber operating a cell phone in the cellular region is able to communicate with or have access to the landline network.

Another type of RF technology is known as Wi-Fi™. This more recently implemented short-range wireless technology includes large-scale installation of WiFi™ base stations. In comparison to the conventional long-range cellular network technology as previously discussed, WiFi™ technology supports short-range communications such as 200-300 meters as opposed to 1500 or more meters provided by cellular telephone base stations. In comparison to installation of each cellular telephone tower, installation of a respective WiFi™ base station is substantially less expensive.

In general, the advanced development of these two types of wireless communication networks enables a respective mobile device user to maintain a connection with a network. For example, one type of ubiquitous technology supporting communications is email. If desired, a respective user can configure an application on their mobile device to receive incoming emails and immediately provide a respective notification on the display screen when the email is received.

BRIEF DESCRIPTION OF EMBODIMENTS

Conventional techniques of message delivery such as email suffer from deficiencies. For example, assume that a respective user configures their computer device to immediately display a corresponding notification or playback an audible tone every time a new message (such as email) is received from a remote party. In certain instances, a respective user may not wish to be bothered with notification of each and every message available to the user, especially in instances when the messages are unsolicited communications such as email spam.

Embodiments herein deviate with respect to conventional techniques. For example, embodiments herein include novel ways of managing delivery of messages in a network environment based on one or more delivery parameters. Delivery parameters can include the location of a recipient, the time of day, occurrence of one or more trigger events, etc.

More specifically, in accordance with one embodiment, a message-processing system (computer hardware and/or software) receives a parameter such as location information indicating a current location of a mobile device operated by a user. The message-processing system maps an identity of the user operating the mobile device to a corresponding subscriber account. The subscriber account may have any of one or more candidate messages available for delivery to the user. As described herein, rather than sending candidate messages to the user of the mobile device as the messages are available, or immediately sending all available messages, embodiments herein include selectively forwarding candidate messages to the mobile device. The selected forwarding prevents the user of the mobile device from being inundated with irrelevant messages.

More specifically, via the subscriber account and in accordance with a respective subscription, the user subscriber has access to a corresponding service provider's network (such as a cable network and corresponding access points). The respective network can include any of one or more resources such as a shared communication link into a subscriber domain in which the user domiciles, one or more wireless access points disposed throughout different geographical regions, etc. Accordingly, the user of the mobile device is able to connect to the respective network in any number of ways.

In one embodiment, the message-processing system utilizes one or more parameters (such as current location of the mobile device, time information, etc.) to identify one or more pertinent messages to forward to the user of the mobile device. For example, assume that the message processing system forwards available messages to the mobile device depending upon the current location of the mobile device in a geographical region. In such an embodiment, the message processing system monitors and detects the current location of the mobile device in a geographical region. The message processing resource identifies one or more available messages that are to be sent to the user of the mobile device when the mobile device is located at the current location. After identifying one or more available messages that match forwarding criteria for a given location, the message processing resource then forwards the location-pertinent messages over the respective network to the mobile device.

Thus, as mentioned, rather than inundating the user of the mobile device with irrelevant messages, embodiments herein include proactively filtering which of multiple candidate messages (available for distribution to the mobile device) are currently forwarded to the user's mobile device.

Again, note that the example of using location information to selectively forward corresponding available messages as shown by way of non-limiting example only. Embodiments herein can include selectively forwarding available candidate messages to a respective subscriber based on any suitable one or more parameters such as time of day, occurrence of trigger events, location information, delivery rules, etc.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. The instructions, when executed by computer processor hardware, cause the computer processor hardware to: receive location information indicating a current location of a mobile device in a network to which a user of the mobile device subscribes; map an identity of the user to a subscriber account and set of available candidate messages associated with the user; utilize the location information to identify a message pertinent to the user and the current location of the mobile device, the message selected from the available candidate messages; and provide notification of the selected message (such as a location pertinent communication) to the user of the mobile device.

One or more embodiments herein include a computer readable storage medium and/or system having instructions stored thereon. The instructions, when executed by computer processor hardware, cause the computer processor hardware to: store a set of candidate messages, the candidate messages allocated for selective distribution to a user of a mobile device; receive location information indicating a current location of the mobile device in a network to which the user subscribes; produce a filter based at least in part on the location information and an identity of the user; and apply the filter to the set of candidate messages to select a message in which to forward over the network to the mobile device.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for facilitating installation of corresponding wireless access points in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 7 is an example diagram illustrating selection of message filter information according to embodiments herein.

Figure 1:
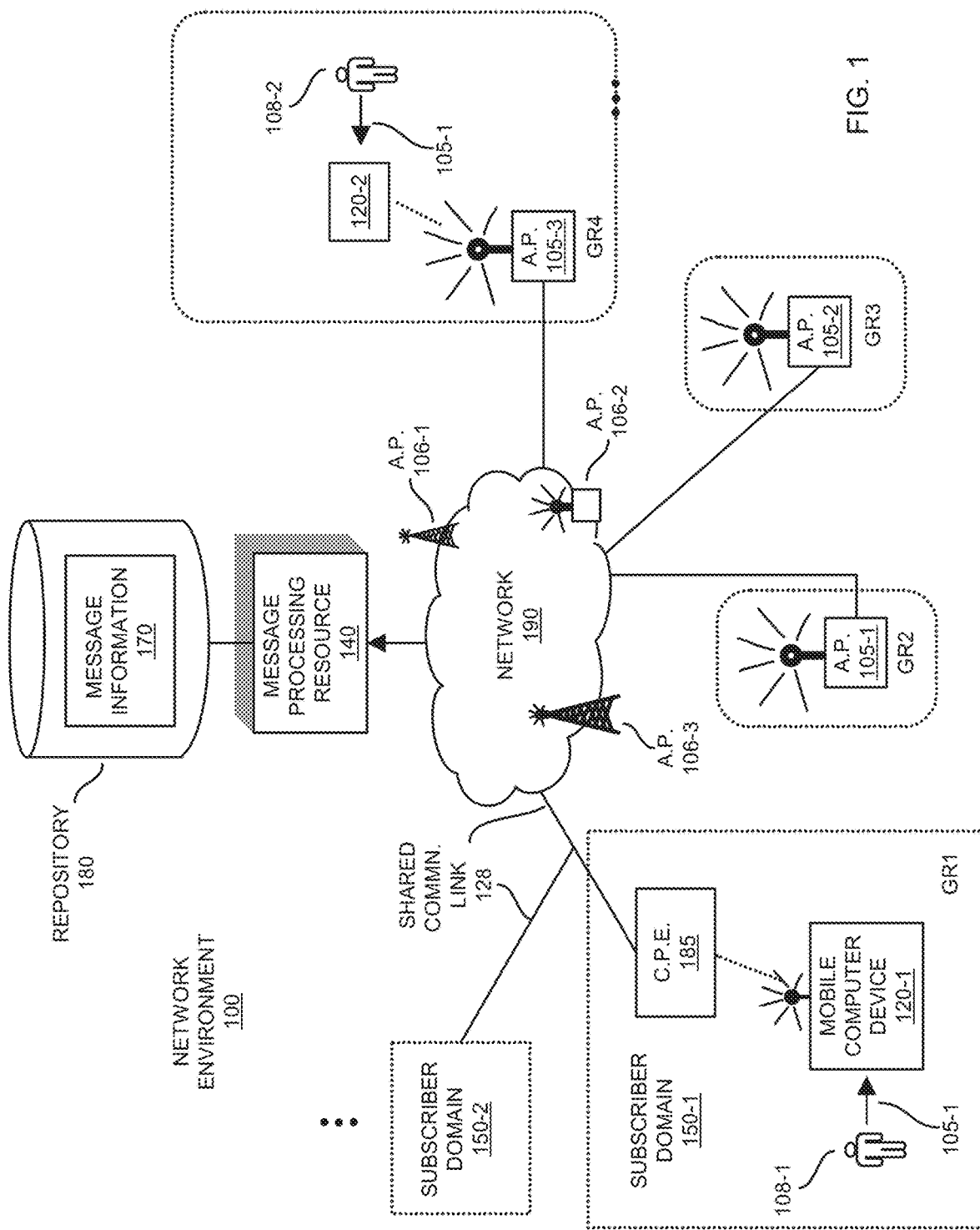
FIG. 1 is an example diagram illustrating delivery of messages to a mobile computer device at a first geographical location of a network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Now, more specifically, FIG. 1 is an example diagram illustrating a network environment and corresponding resources supporting selective distribution of messages to mobile communication devices and corresponding subscribers according to embodiments herein.

As shown, network environment 100 includes multiple mobile communication devices 120 (e.g., mobile communication device 120-1, mobile communication device 120-2, etc.).

A respective user (subscriber) operates each of the multiple communication devices 120. For example, user 108-1 operates mobile communication device 120-1; user 108-2 operates mobile communication device 120-2; and so on. Network environment 100 can include any number of mobile communication devices 120.

Each of the mobile communication devices 120 can be any suitable type of computer device. For example, a respective mobile communication device in network environment 100 can be a cell phone, mobile computer, mobile phone device, digital assistant, a laptop computer, a personal computer, a notebook computer, a netbook computer, a handheld computer, a workstation, etc.

In accordance with further embodiments, note that network 190 can be or include any suitable type of wired or wireless network resources facilitating communications with message-processing resource 140.

As further shown, network environment 100 includes message processing resource 140. As its name suggests, message-processing resource 140 processes and manages delivery of messages to mobile communication devices 120.

In one embodiment, a respective mobile communication device 120 is a client device; message-processing resource 140 is a server resource. By way of non-limiting example embodiment, a message management application in the mobile communication device 120-1 and message-processing resource 140 can be configured to communicate in accordance with any of multiple different types of suitable client-server communication protocols. In one embodiment, at least a portion of network 190 includes a packet-switched network over which the message-processing resource 140 and the mobile communication devices 120 communicate with each other.

In accordance with further embodiments, subsequent to the mobile communication device establishing a respective connection with the message processing resource 140, the message-processing resource 140 is a server resource configured to selectively and automatically deliver messages to each of the respective mobile communication devices 120 depending on delivery parameters such as a respective location of mobile communication devices 120 in network environment 100, the time of day, occurrence of one or more trigger events associated with intended message recipients, rules, etc.

More specifically, in accordance with one embodiment, during selective delivery of messages, assume that the message-processing resource 140 (computer hardware and/or software) receives a parameter such as location information indicating a current location of a mobile communication device 120-1 operated by user 108-1. The message-processing resource 140 maps an identity of the user 108-1 and/or the mobile communication device 120-1 to a corresponding subscriber account associated with the respective user 108-1. The subscriber account may have any of one or more associated candidate messages (stored in message information 170) available for delivery to the user 108-1.

As further described herein, rather than sending all buffered candidate messages to the user 108-1 of the mobile device 120-1 as the messages are available or sending the messages all at once to the intended recipient (user 108-1), embodiments herein include selectively forwarding different types of messages such as time-sensitive messages, location-sensitive messages, etc., to each of the mobile communication devices 120 such that users 108 of the mobile communication devices 120 are not inundated with irrelevant messages. Instead, the users 108 receive messages depending upon current operating conditions.

More specifically, in one embodiment, assume that each of the respective users 108 subscribes to use of network services provided by a network service provider (such as company XYZ). In this example embodiment, assume that the network service provider (such as a cable network service provider) provides a service group including each of the subscriber domain 150-1, subscriber domain 150-2, etc., access to network 190 via a shared (physical) communication link 128. Shared communication link 128 can include any number of multiple channels to which a respective subscriber can tune. Via shared communication link 128 and respective customer premises equipment, each of the corresponding subscribers in respective subscriber domains 150 (such as domiciles, home environment, residence, etc.) is able to access network 190 and perform functions such as retrieval and playback of broadcast content, retrieval and playback of on-demand content, retrieval of over-the-top content, transmission of content, etc.

Assume in this example embodiment that subscriber domain 150-1 represents a home where user 108-1 lives. Customer premises equipment 185 disposed in subscriber domain 150-1 can include resources such as one or more set-top boxes, one or more cable modems, one or more WiFi™ access points, etc., enabling the occupants in subscriber domain 150-1 to access to network 190 and respective cable services offered by a respective service provider.

In addition to providing access to network 190 via the shared communication link 128, the respective service provider may provide access to network 190 via respective wireless access points installed at public locations (as opposed to customer premises equipment at private locations in a respective home environment). For example, as shown in network environment 100, geographical region GR2 can include a service provider installed wireless access point 105-1 operated by the service provider; geographical region GR3 can include a service provider installed wireless access point 105-2 operated by the service provider; geographical region GR4 can include the service provider installed wireless access point 105-3 operated by the service provider; and so on.

A respective subscriber such as user 108-1 of network services can operate a respective mobile communication device in any of the locations GR1, GR2, GR3, GR4, etc., in network environment 100 in order to access network 190 (which can include or provide access to the Internet). In one embodiment, each of the subscribers (users 108) is afforded use of the service providers publicly located access points 105 when the respective user (subscriber) purchases a data service plan enabling retrieval of over-the-top content over shared communication link 128.

The wireless access points 105 disposed at different public locations in network environment 100 provide the respective subscribers access to the service provider's network and corresponding resources from many different locations. Thus, the respective subscriber (user 108-1) is not limited to use of customer premises equipment 185 to access network 190 and corresponding service provider's content over the Internet.

In addition to publicly located but private wireless access points 105 provided by the service provider, note that network 100 can include any number of publicly available WiFi™ access points 106 provided by one or more different service providers. Such access points enable a user to access network 190 and communicate over the Internet as well. However, the publicly available the access points operated by the different service providers may not allow the user to access content provided by the respective user's service provider. In one embodiment, via the public WiFi™ access points, the user 108-1 operating mobile communication device 120-1 is able to communicate with and retrieve messages from message processing resource 140.

In addition to public and private WiFi™ access points, the network environment 100 can include any number of cellular access points enabling the corresponding users 108 to access network 190. For example, network environment 100 can include access points 106-1, 106-2, 106-3, etc., supporting cellular and/or WiFi™ communications. Assuming that the respective user also subscribes to a cellular phone provider, the user 108-1 can access network 190 via a respective wireless communications through any of access points 106 using a respective data link.

Any suitable wired or wireless communication protocol such as WiFi™, cellular phone protocols such as those based on CDMA (Code Division Multiple Access), GSM (Global System for Mobile Communications), IP (Internet Protocol), etc., can be used to communicatively connect a respective mobile communication device to message-processing resource 140. Accordingly, there are many different ways in which a respective mobile computer communication device 120 can communicate messages to and receive communications from message-processing resource 140.

As previously mentioned, the message processing resource 140 can be configured to selectively forward messages to a respective user. As a specific example embodiment, the message processing resource 140 has access to the message information 170 stored in repository 180. Message information 170 includes any number of messages earmarked for delivery to corresponding users 108.

The message processing resource 140 conditionally forwards messages to respective recipients (users 108). For example, in one embodiment, the message processing resource 140 utilizes one or more parameters (such as current location of the mobile device, time information, delivery rules, etc.) to identify one or more pertinent messages to forward to the user of the mobile device.

Assume that the message processing resource 140 forwards available messages to the mobile communication device 120-1 depending upon the current location of a respective mobile device in network environment 100. In such an embodiment, the message-processing resource 140 monitors and detects the current location of the mobile communication device 120-1 in a geographical region. The message-processing resource 140 identifies one or more available messages that are to be sent to the user 108-1 of the mobile communication device 120-1 when the mobile communication device 120-1 is located at a given location. After identifying one or more available messages that match forwarding criteria associated with user 108-1, the message-processing resource 140 then forwards any location-pertinent messages over the respective network 190 to the mobile communication device 120-1.

Thus, rather than inundating the user 108-1 of the mobile communication device 120-1 with irrelevant messages, embodiments herein include proactively filtering which of multiple candidate messages (addressed and available for distribution to the user 108-1 of the mobile communication device 120-1) are forwarded to the user's mobile communication device 120-1.

Again, note that the example of using location information to selectively forward corresponding available messages as shown by way of non-limiting example only. Embodiments herein can include selectively forwarding available candidate messages to a respective subscriber based on any suitable one or more parameters such as time of day, occurrence of trigger events, location information, etc.

As previously mentioned, embodiments herein are useful over conventional techniques because they provide a way of managing distribution of messages such that the messages are delivered at more suitable times for the user. For example, the message-processing resource 140 as described herein can be configured to monitor a parameter such as a location of a respective mobile communication device 120-1 and forward messages to the mobile communication device that are pertinent to the user 108-1 at the user's current location. In such an instance, because the available messages are filtered for delivery, the user 108-1 of the mobile communication device 120-1 is not inundated with irrelevant and potentially annoying messages.

In one non-limiting example embodiment, the messages delivered by message-processing resource 140 are messages generated by the service provider to notify the corresponding user of different information regarding their account.

Figure 2:
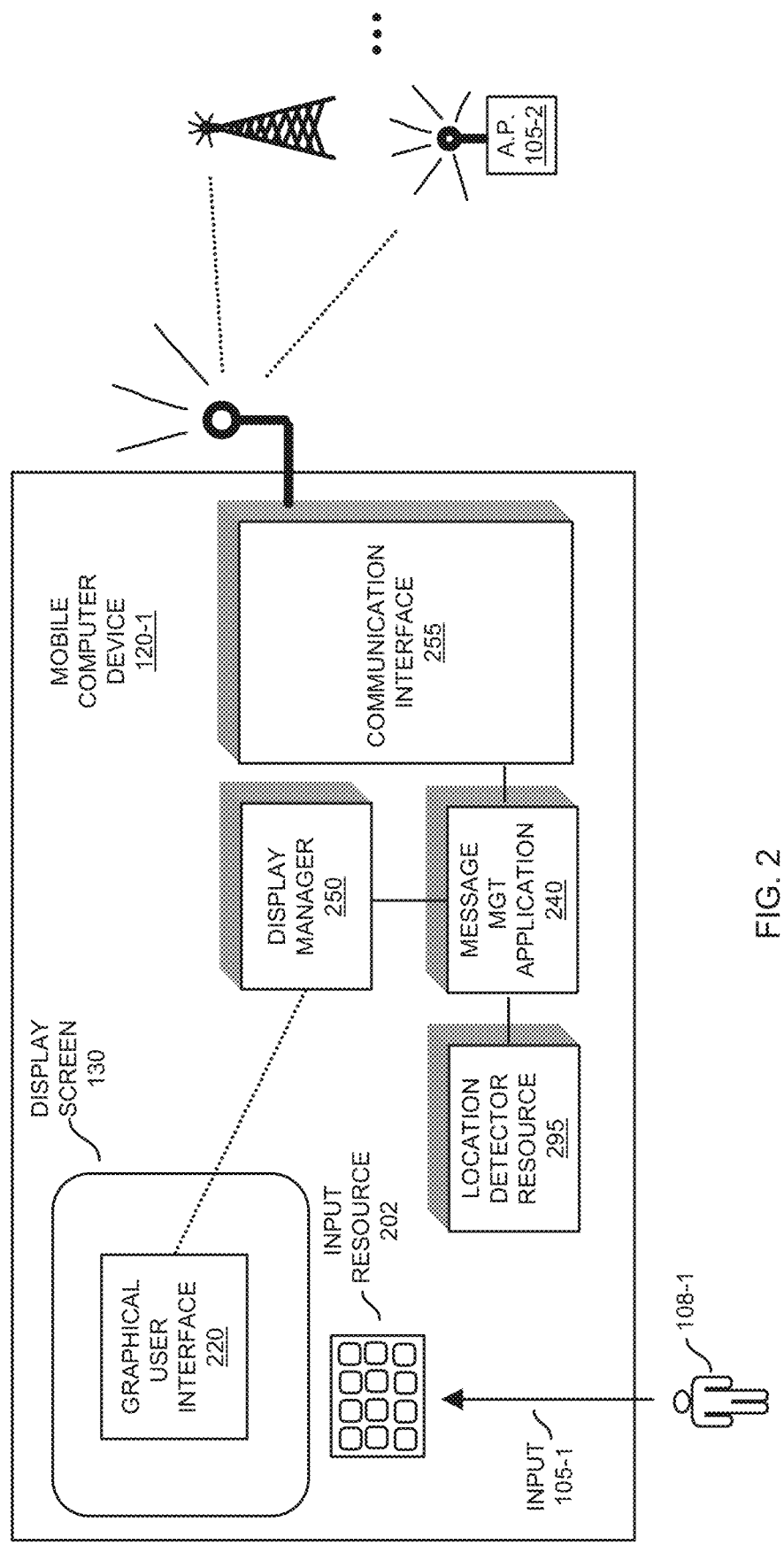
FIG. 2 is an example diagram illustrating a mobile computer device and corresponding message management application according to embodiments herein.

FIG. 2 is an example block diagram illustrating functionality associated with a respective mobile computer device according to embodiments herein. Note that mobile communication device 120-1 can include any suitable hardware and software resources to carry out operations as discussed herein.

More specifically, as shown in this example embodiment, mobile communication device 120-1 includes display screen 130, message management application 240, display manager 250, location detection resource 295, communication interface 255, etc. Each mobile communication device and the environment 100 can operate in a similar manner and include similar resources, interfaces, applications, etc.

Assume that the user 108-1 initiates execution of message management application 240. In one embodiment, subsequent to execution, the message management application 240 (such as an agent, daemon, etc.) continuously executes on the mobile computer device 150-1 in the background regardless of whether the mobile communication device 120 is in connection with network 190 and corresponding message-processing resource 140. If a network connection is not established with network 190 (through an access point) to map management resource 140, the message management application 240 monitors the network environment 100 for an available access point in which to initiate establishing a connection and subsequently communicate with message-processing resource 140.

As previously discussed, subject to authorization, mobile communication device 120-1 can establish a communication link with any of access points 105, access points 106, customer premises equipment 185, etc., to establish a connection with network 190 and communicate with message-processing resource 140.

Communications between the message management application 240 and the message-processing resource 140 (as managed by a respective service provider that provides the user 108-1 access to shared communication link 128) enables the respective user 108-1 of mobile communication device 120-1 to be apprised of relevant messages.

As shown, via display manager 250 in mobile communication device 120-1, the message management application 240 initiates display of corresponding graphical user interface 220 on display screen 130 of mobile communication device 120-1. Graphical user interface 220 on display screen 130 enables the respective user 108-1 to view one or more messages received from message-processing resource 140. For example, the message management application 240 can be configured to receive one or more messages from message-processing resource 140. Message management application 240 controls display manager 250 to display the one or more messages in graphical user interface 220 on display screen 130.

In addition to or in lieu of providing a visual indication, the message management application 240 can be configured to provide any suitable audio indication regarding a respective message.

Assume in this example embodiment that the user 108-1 submits input 105-1 (e.g., commands, clicks, button presses, etc.) through input resource 202 to execute message management application 240. Via input 105-1, the user 108-1 can configure the message management application 240 to immediately display any received messages from message processing resource 140 on display screen 130. As mentioned, display of messages can be accompanied by a respective audio tone indicating that a new message was received.

As previously discussed, message management application 240 attempts to establish a respective communication link with a wireless access point associated with network 190. Subsequent to establishing a respective wireless communication link, the message management application 240 communicates over network 190 with message-processing resource 140 to retrieve relevant messages.

In one embodiment, the map management application 240 of mobile communication device 120-1 receives location information from location detection resource 295. As its name suggests, the location information received from location detection resource 295 specifies a current location of the mobile communication device 120-1 in network environment 100.

By way of non-limiting example, the mobile communication device 120-1 can include location detection resource 295 such as a GPS (Global Positioning System) to determine a current location of the mobile communication device 120-1 in a geographical region.

Note that any suitable technique can be used to determine a location of a respective mobile communication device in network environment 100. For example, embodiments herein contemplate use of satellite navigation systems such as GPS (used in the U.S.), Galileo (used in Europe), GLONASS (used in Russia), IRNSS (used in India), Compass (used in China), or the like. Further embodiments herein can include use of terrestrial-based location services such as LORAN, cell tower triangulation, inertial navigation services, WLAN-SSID-based approaches, etc., to determine a respective location. Thus, location detection resource 295 can include use of any location service to produce location information for use by map management application 240.

The message management application 240 forwards the location information over network 190 to the message-processing resource 140.

Note that in certain instances, as previously discussed, the message processing resource 140 may not need to rely on receiving the location information from the mobile communication device 120-1 to determine the current location of the mobile communication device 120-1 and corresponding user 108-1. For example, the message processing resource 140 can learn of the location of the respective mobile communication device 120-1 depending upon which of multiple access points in the network environment 100 the mobile communication device 120-1 communicates messages to message processing resource 140.

As an example, assume that the user 108-1 operates mobile computer device 120-1 in subscriber domain and communicates through customer premises equipment 185 (such as an access point, cable modem, etc.) over network 190 to message processing resource 140. In such an instance, communications to the message-processing resource 140 include a network address of the customer premises equipment 185, indicating that the mobile computer device 120-1 is currently within geographical region, GR1. Thus, in certain circumstances, the message processing resource 140 can process a message received from the mobile message management application 240 to determine a current location of the respective mobile device and corresponding user in the network environment 100.

As another example, assume that the user 108-1 operates mobile computer device 120-1 and communicates through access point 105-1 in geographical region GR2. Communications from mobile communication device 120-1 through the access point 105-1 over network 190 to message processing resource 140 can include a network address of the access point 105-1, thus indicating to the message processing resource 140 that the mobile communication device 120-1 is currently within geographical region GR2.

In this manner, the communications from a respective mobile communication device and corresponding path of delivery may indicate its proximity in network environment 100.

As previously discussed, note again that the mobile communication device 120-1 can include a respective location detector resource 295 that generates specific location information indicating a current location of the mobile communication device 120-1 in network environment 100. In such an instance, messages from the message management application 240 to the message processing resource 140 indicate the current location of the mobile communication device.

Thus, message-processing resource 140 can be apprised of or learn of a current location of a respective mobile communication device in many different ways.

Note that any of the functionality as discussed herein such as functionality provided by message management application 240 and message-processing resource 140 can be located at any suitable device. For example, any suitable portion of functionality provided by the message-processing resource 140 can be performed by the respective mobile computer device. Any suitable portion of the functionality performed by message management application 240 can be performed by the message-processing resource 140.

Figure 3:
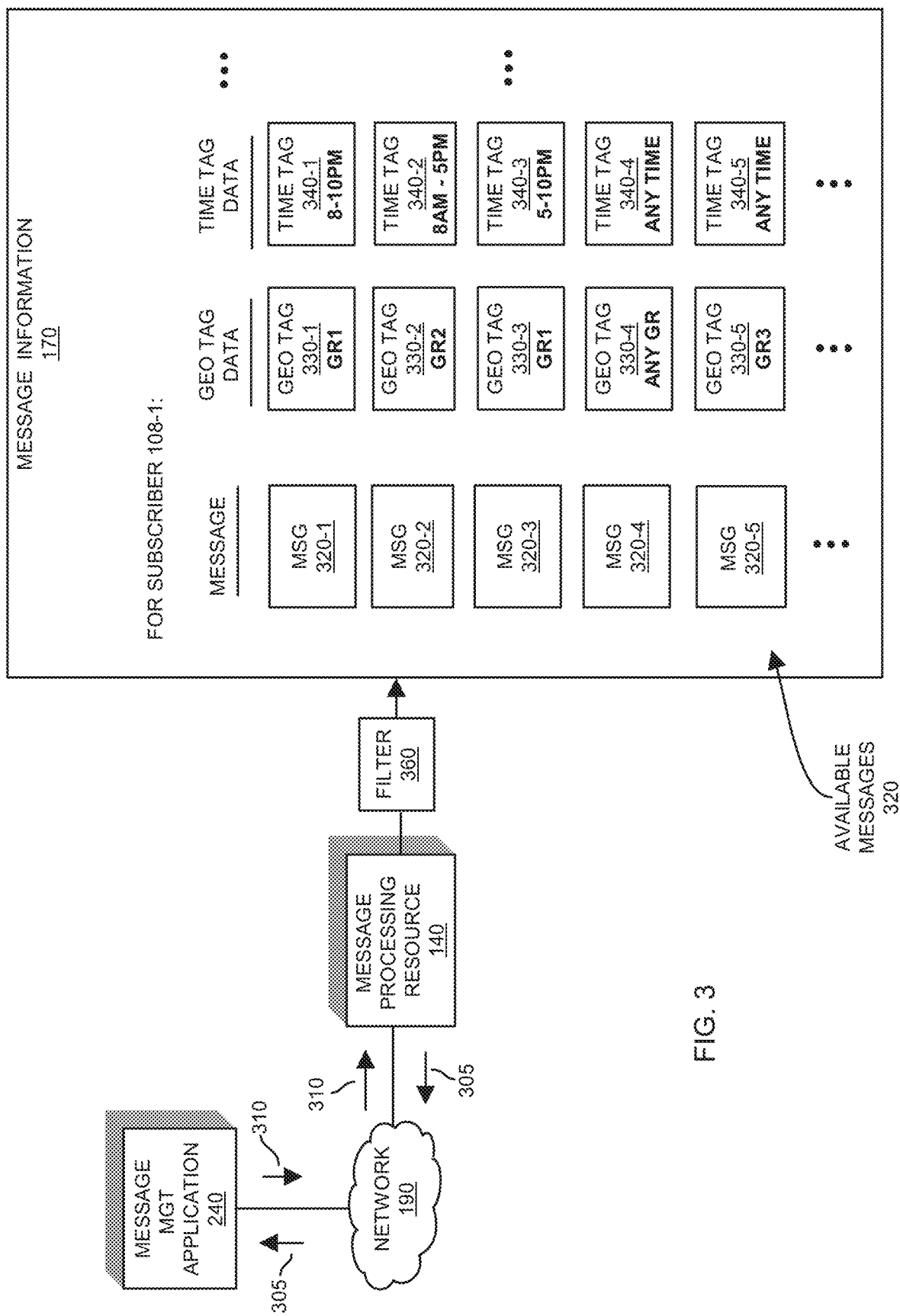
FIG. 3 is an example diagram illustrating filtering and selective delivery of messages according to embodiments herein.

FIG. 3 is an example diagram illustrating filtering of messages according to embodiments herein.

As previously discussed, one embodiment herein includes selectively forwarding messages to the mobile communication devices 120 depending upon their current locations in network environment 100.

As shown in FIG. 3, the message-processing resource 140 stores sets of candidate messages in repository 180. The candidate messages are allocated for selective distribution to each of the users. In this example embodiment, the message information 170 includes messages 320 allocated for selective delivery to user 108-1 of mobile communication device 120-1.

In one embodiment, to facilitate selective delivery of messages, the message-processing resource 140 produces tag data for each of the messages 320 addressed for delivery to user 108-1. As further discussed below, the tag data indicates circumstances in which to selectively forward messages (notifications) to the mobile communication device 120-1 operated by the user 108-1.

For example, the message-processing resource 140 produces geo-tag data 330-1 and time tag data 340-1 and assigns it to message 320-1; the message processing resource 140 produces geo-tag data 330-2 and time tag data 340-2 and assigns it to message 320-2; the message processing resource 140 produces geo-tag data 330-3 and time tag data 340-3 and assigns it to message 320-3; the message processing resource 140 produces geo-tag data 330-4 and time tag data 340-4 and assigns it to message 320-4; the message processing resource 140 produces geo-tag data 330-5 and time tag data 340-5 and assigns it to message 320-5; and so on.

In one embodiment, the geo-tag data indicates a current corresponding location that the mobile communication device 120-1 must currently reside in order to send a respective message. In other words, the respective geo-tag data 330 indicates a respective geographical location in which the mobile device must reside in order for a respective message to be eligible for delivery to the respective mobile device. In this example embodiment, the time tag data indicates a respective time of day in which the corresponding message is eligible for delivery to the mobile communication device 120-1.

Further in this example embodiment, assume that: i) the message 320-1 is a candidate message indicating that a particular pay-per-view show is available, ii) corresponding geo-tag data 330-1 includes geo-data tag GR1, indicating that the message 320-1 is pertinent for delivery to user 108-1 and corresponding mobile communication device 120-1 if the user 108-1 is located in the subscriber domain 150-1 (i.e., geographical region GR1), and iii) the time tag data 340-1 indicates that the message 320-1 is eligible for delivery to the mobile communication device 120-1 between only 8 PM and 10 PM (e.g., relevant times when the respective user 108-1 would be interested in viewing such available content).

Further, in this example embodiment, assume that: i) the message 320-2 is a candidate message indicating that a particular store or business is open and located in geographical region GR2, ii) corresponding geo-tag data 330-2 associated with message 320-2 includes geo-data GR2, indicating that the message 320-2 is pertinent for delivery to user 108-1 if the user 108-1 is located in the geographical region GR2, and iii) the time tag data 340-2 indicates that the message 320-2 is eligible for delivery to the mobile communication device 120-1 between only 8 AM and 5 PM (such as when the respective business is open to customers).

Still further in this example embodiment, assume that: i) the message 320-3 is a candidate message indicating that a cable network bill is due to pay for services provided by the service provider, ii) corresponding geo-tag data 330-3 associated with message 320-3 includes geo-data GR3, indicating that the message 320-3 is pertinent for delivery to user 108-1 if the user 108-1 is located in the geographical region GR1, and iii) the time tag data 340-3 indicates that the message 320-3 is eligible for delivery to the mobile communication device 120-1 between only 5 PM and 10 PM (such as when the respective user 108-1 has selected to be notified of the respective bill).

Yet further in this example embodiment, assume that: i) the message 320-4 is a candidate message indicating that the user's house has just been burglarized (this may be detected by the customer premises equipment 185 located in subscriber domain 150-1, message-processing resource 140 receives notification of the burglary from appropriate customer premises equipment 185), ii) corresponding geo-tag data 330-4 associated with message 320-4 includes geo-data ANY GR (indicating that the geographical region can be any location), the message 320-4 is pertinent for delivery no matter where the user 108-1 and corresponding mobile communication device 120-1 are located in the network environment 100, and iii) the time tag data 340-4 indicates that the message 320-4 is eligible for delivery to the mobile communication device 120-1 at any time (since the subscriber would like to be notified immediately of such an event).

Still further in this example embodiment, assume that: i) the message 320-5 is a candidate message indicating that free WiFi™ access is available from a nearby access point provided by the service provider, ii) corresponding geo-tag data 330-5 associated with message 320-5 includes geo-data GR3, indicating that the message 320-5 is pertinent for delivery to user 108-1 if the user 108-1 is located in the geographical region GR3 (and when the user 108-1 is using another out of network service provider's access point to communicate with the message-processing resource 140), and iii) the time tag data 340-5 indicates that the message 320-5 is eligible for delivery at any time.

Assume in this example embodiment that message management application 240 in the mobile communication device 120-1 transmits communication 310 over network 190 to message processing resource 140. The communication 310 indicates to the message processing resource 140 that the message management application 240 is available to receive pertinent messages associated with user 108-1.

In one embodiment, the message management application 240 continuously transmits messages to the message-processing resource 140 indicating a current location of the mobile communication device 120-1. Via receipt of communications 310, the message processing resource 140 detects movement of the mobile communication device to geographical region GR1 (subscriber domain 150-1) in which the user 108-1 domiciles. As discussed in more detail below, in response to detecting movement of the mobile communication device 120-1 into the geographical region GR1 as shown in FIG. 1, the message processing resource 140 produces one or more messages relevant to the geographical region GR1 and forwards them to the corresponding message management application 240.

In accordance with further embodiments, via communications 310 from the management message management application 240 to the message processing resource 140, the message-processing resource 140 receives a unique identifier value such as a network address of the mobile communication device 120-1 or identity of the user 108-1. Using the unique identifier value, the message processing resource 140 maps an identity of the user and/or communication device 120-1 to a corresponding user subscriber account. In one embodiment, mapping the identity of the user 108-1 and/or mobile communication device 120-1 to the subscriber account includes: receiving a unique network address assigned to the mobile communication device 120-1 and then identifying the subscriber account using the received unique network address of the mobile communication device 120-1.

As previously discussed, the subscriber account for user 108-1 can be a fee-based subscriber account managed by the (cable) network service provider. The network service provider provides the user access to the network 190 at multiple access points (such as access points located inside and outside of subscriber domain 150-1).

Message information 170 can include messages for delivery to a number of different subscribers. Using the corresponding unique identifier value, the message processing resource 140 identifies a particular set of messages that are available for delivery to the corresponding subscriber user 108-1. In this example embodiment, message information 170 indicates that messages 320 are currently available for conditional delivery to user 108-1 operating mobile communication device 120-1.

As previously discussed, the one or more communication 310 from message management application 240 can include parameters such as location information indicating a current location of the respective mobile communication device 120-1 as well as the current time. As further shown, in one embodiment, message-processing resource 140 receives location information from message management application 240 indicating a current location of the mobile communication device 120-1 in network environment 100. Note again that as an alternative to receiving the location information from the respective mobile communication device 120-1, the message-processing resource 140 can be configured to detect that the mobile communication device 120-1 operated by the user 108-1 has established a connection with a particular access point (such as an access point disposed in subscriber domain 150-1 for a publicly located service provider access point). It is known that the customer premises equipment 185 is disposed in subscriber domain 150-1 in geographical region GR1. Hence, communications from the access point in the subscriber domain 150-1 are known to be from geographical region GR1.

Based on information such as location information, time information, etc., associated with the respective subscriber user 108-1, the message-processing resource 140 produces a filter 360 based at least in part on the location information. The filter 360 can specify a respective account (such as an account associated with subscriber user 108-1) in which to apply the filter 360. The message-processing resource 140 applies the filter 360 to the set of candidate messages to select one or more messages 320 in which to forward over the network 190 to the message management application 240 of the mobile communication device 120-1.

As previously discussed with respect to FIG. 1, assume that the mobile communication device 120-1 and corresponding user 108-1 are located in subscriber domain 150-1 in network environment 100. The message management application 240 transmits the communication 310 to message-processing resource 140. The location information in the communication 310 indicates a current location of the mobile communication device 120-1. In this instance, the communication 310 indicates that mobile communication device 120-1 is located in the subscriber domain 150-1 (geographical region GR1).

Referring again to FIG. 3, in this instance, the message processing resource 140 produces filter 360 to include geo-tag data GR1. As previously discussed, message information 170 includes many messages 320 available for delivery to the corresponding user 108-1. However, using filter 360, the message processing resource 140 compares the tag GR1 (the users current location) to the geo-tag data 330 associated with respective messages 320.

In this example embodiment, based on the comparison, the message-processing resource 140 identifies that geo-tag data 330-1, geo-tag data 330-3, and geo-tag data 330-4 all match the tag data GR1 specifying a current location of the mobile communication device 120-1. In such an instance, message 320-1, message 320-3, and message 320-4, are all candidate messages for potential forwarding to message management application 240.

Assume that the current time is 6 PM. The message-processing resource 140 compares the current time to the time tag data 340-1, time tag data 340-3, and time tag data 340-4. Based on the comparison, the message processing resource 140 identifies that time tag data 340-1 (8 PM to 10 PM) falls outside of current time range. Accordingly, in this example embodiment message 320-1 is not a candidate for transmission to message management application 240 at this time. However, the current time 6 PM falls within the range of time tag data 340-3 and time tag data 340-4. Accordingly, message 320-3 and message 320-4 are both candidates for immediate transmission over network 190 to message management application 240.

Via communications 305, message-processing resource 140 transmits message 320-3 and message 320-4 over network 190 to message management application 240. Message management application 240 receives the messages and initiates display of the corresponding messages on display screen 130 for viewing by the respective user 108-1.

As previously discussed, message 320-4 notifies the user 108-1 that his house is currently being burglarized. Message 320-3 indicates to the user 108-1 (subscriber) that a corresponding bill is due for payment by the subscriber to the respective cable network service provider. In one embodiment, the message processing resource 140 (operated and managed by the respective service provider) communicates the one or more selected messages (such as message 320-3 and message 320-4) over the network equipment such as customer premises equipment 185 to the mobile communication device 120-1.

Assuming that the user 108-1 operating mobile communication device 120-1 remains in subscriber domain 150-1 until 10 PM, at or around 8 PM, the message-processing resource 140 detects that message 320-1 is now a candidate for delivery to the user 108-1 because the user still currently resides in geographical region GR1 and that the current time is between 8 PM and 10 PM (as required by time tag data 340-1 to send message 320-1). In such an instance, the message processing resource 140 forwards the corresponding message 320-1 to the message management application 240 because the corresponding filter 360 indicates that the mobile communication device 120-1 is located in geographical region GR1 and that the time is 8 PM.

As previously discussed, after delivery of the respective message 320-1, the message management application 240 provides an audio alert and/or displays a corresponding message on the display screen 130 to notify the corresponding user 108-1 of the availability of the specific pay-per-view show (as indicated by message 320-1) that the user 108-1 is likely to be interested in viewing.

In one embodiment, the message processing resource 140 or other suitable entity analyzes a history of content previously delivered to the user 108-1 in the subscriber domain 150-1. Based on the history of the previously delivered content to subscriber domain 150-1, the message processing resource 140 produces message 320-1 for delivery to user 108-1. As previously discussed, the message 320-1 can indicate availability of newly available content (such as the specific pay-per-view content) for retrieval and viewing by the user 108-1 in the subscriber domain 150-1.

Accordingly, the message-processing resource 140 can be configured to monitor consumption of data by the corresponding subscriber user 108-1 and generate appropriate messages for the user to view similar types of available content. As mentioned, via application of filter 360 as discussed herein, the message processing resource 140 initiates transmission of message 320-1 at the appropriate time for user 108-1.

Accordingly, embodiments herein include detecting a time of day that the user is located at the current location GR1 (such as subscriber domain 150-1) and, in addition to utilizing the location information to identify the message pertinent to the user and the current location of the mobile device, utilizing the detected time of day as an additional parameter to identify the message pertinent to the user 108-1. Again, as discussed, any suitable number of parameters can be used to a respective subscriber.

Figure 4:
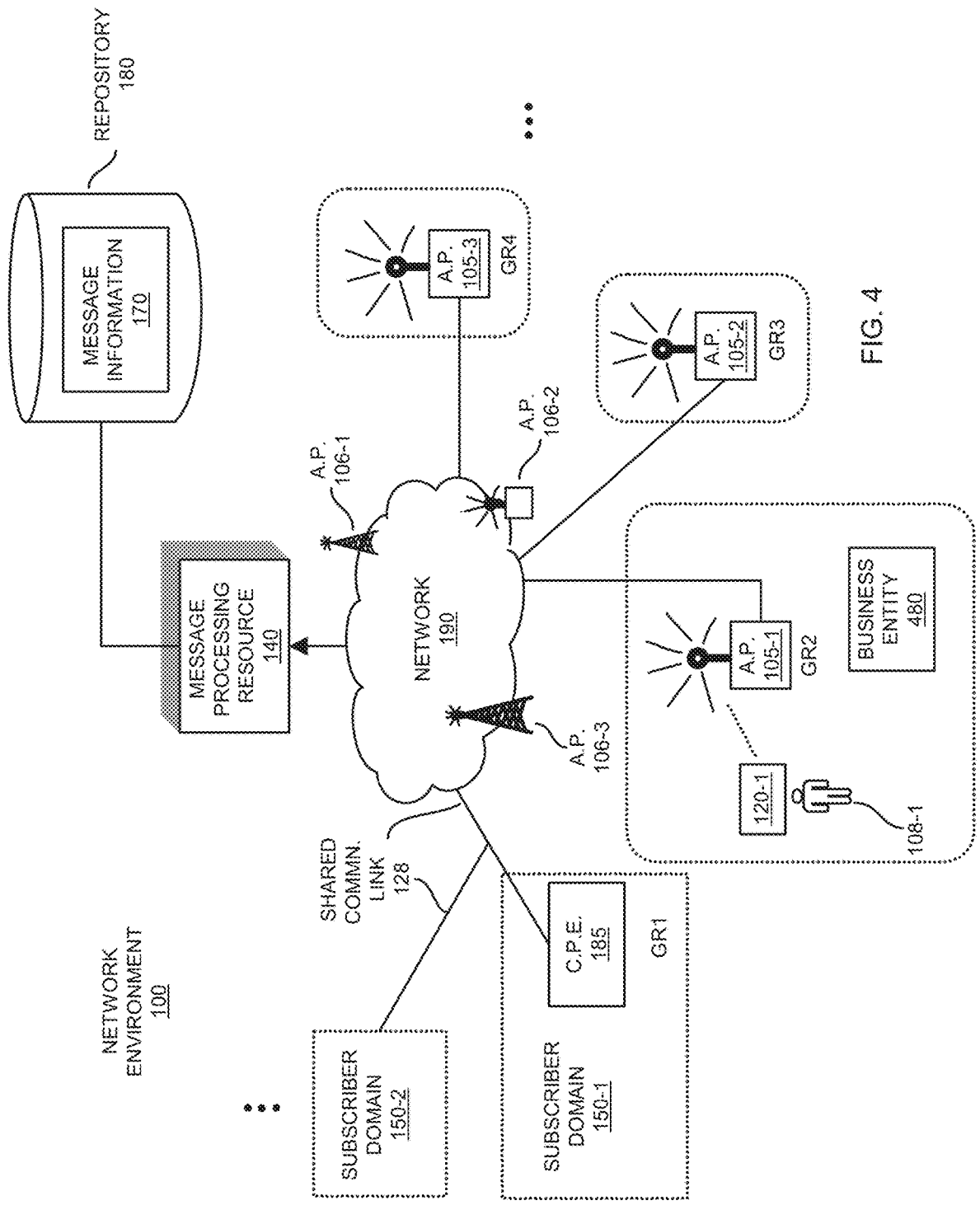
FIG. 4 is an example diagram illustrating selective delivery of messages to a mobile computer device in a second geographical location of a network environment according to embodiments herein.

FIG. 4 is an example diagram illustrating delivery of messages to a mobile computer device in a second geographical location of a network environment according to embodiments herein.

As shown, the user 108-1 operating mobile communication device 120-1 moves from location geographical region GR1 (subscriber domain 150-1) as in FIG. 1 to geographical region GR2 in FIG. 4. Assume that the message management application 240 temporarily experiences a loss of connection with message-processing resource 143 in transition from subscriber domain 150-1 (geographical region GR1) to geographical region GR2.

In one embodiment, during the transition, the message management resource 240 continuously attempts to connect to any available access points in network environment 100 to communicate again with message processing resource 140. This can include sending out a probe request message and checking for availability of any WiFi™ access points that are available in the particular area. Alternatively, the message management application 240 can attempt to communicate over a cellular link (such as a data link) over network to communicate with message processing resource 140.

Assume in this example, that the message management application 240 detects presence of access point 105-1 in network environment 100. In such an instance, message management application 240 establishes a respective wireless connection with access point 105-1 to communicate over network 190 to message-processing resource 140.

After establishing the corresponding new wireless connection with access point 105-1, the message management application 240 transmits corresponding information such as location information of a current whereabouts of the mobile communication device 120-1 to message-processing resource 140. Accordingly, via communications received from the message management application 240, the message-processing resource 140 detects that the communication device 120-1 and corresponding user 108-1 are currently located in geographical region GR2.

In this example embodiment, note that business entity 480 as well as access point 105-1 is located in geographical region GR2.

Referring again to FIG. 3, based on receiving notification and/or determining that the communication device 120-1 and corresponding user 108-1 have moved and are now located in geographical region GR2, the message processing resource 140 produces a corresponding filter 360 to determine if any messages are available for delivery to the new location GR2.

In a manner as previously discussed, the message processing resource 130 utilizes the location information (GR2) and current time to produce filter 360. To identify relevant messages 320 to forward to the message management application 240, the message processing resource 140 compares the current location of the mobile communication device 120-1 (value of geographical region GR2) to corresponding geo-tag data 330. Based on the comparison, the message-processing resource 140 determines that geo-tag data 330-2 is equal to geographical region GR2.

Assume that the time of day is 4 PM. In such an instance, the current time of day falls within the time ranges specified by time tag data 340-2.

In response to detecting these conditions, the message-processing resource 140 forwards the message 320-2 satisfying the search criteria as specified by filter 360 over network 190 to message management application 240. Message management application 240 produces an audio and/or visual indication of the message 320-2 to user 108-1. For example, in one embodiment the message management application 240 initiates display of corresponding message 320-2 on display screen 130 for viewing by the respective user 108-1.

In accordance with yet further embodiments, note that the message processing resource 140 or any other suitable for the can be configured to monitor habits of the user 108-1 operating the mobile device 120-1 at the location GR2 on a prior occasion (such as the day before) of the user operating the mobile device at the current location GR2. Message processing resource 140 can be configured to utilize the learned habits of the user 108-1 operating the mobile medication device 120-1 on the prior occasion as a basis to identify one or more messages pertinent to the user of the current location GR2 of the mobile communication device 120-1.

More specifically, business entity 480 such as a coffee shop (retail entity) may represent a business in which the corresponding user 108-1 conducted business on a prior occasion (such as yesterday) of operating the mobile device at the current location GR2. The user may have previously purchased coffee from the business entity 480. Based on the user's prior habit of purchasing one or more items from the corresponding business entity 480, the message-processing resource 140 or other suitable can be configured to generate message 320-2 to indicate a promotion of goods and/or services available from the corresponding business entity 480.

The message 320-2 can be assigned geo-tag data 330-2 (indicating that the message 320-2 is eligible for transmission to the management application 240 when the mobile communication device 120-1 is located in geographical region GR2) and time tag data 340-2 (indicating that the message 320-2 is eligible for transmission to the message management application 240 between 8 AM and 5 PM).

Assuming that the corresponding geo-tag data 330-2 and corresponding time tag data 340-2 respectively indicate geographical region GR2 and allow transmission at a time of 4 PM, the message processing resource 140 utilizes filter 360 to select and produce message 320-2 for delivery over network 190 to message management application 240.

Accordingly, use of the location information to identify a message 320-2 pertinent to the user in the current location of the mobile communication device 120-1 can include producing the message 320-2 to include a promotion of goods available from the business entity 480 (retail entity).

In accordance with yet further embodiments, note that the business entity 480 can be a physical service center that manages distribution and/or return of customer premises equipment associated with the service provider managing shared communication link 120 and corresponding access points 105. The message 320-2 can be configured to notify the corresponding user 108-1 that the corresponding user 108-1 is currently near business entity 480 located in geographical region GR2. The current location GR2 is a remote location with respect to a subscriber domain 150-1 in which the user 108-1 domiciles. As previously discussed, the subscriber domain 150-1 and corresponding user 108-1 have access to the network 190 via a shared cable network link 128 provided by a respective network service provider managing all or a portion of the network 190. As mentioned, the subscriber domain 150-1 can include customer premises equipment 185 to retrieve content over the shared cable network link 128. The message-processing resource 140 utilizes the location information (GR2) to identify the message pertinent to the user 108-1 at the current location GR2. In a manner as previously discussed, the message-processing resource 140 detects that the user 108-1 is located in a vicinity of a distributor (such as business entity 480) that makes the customer premises equipment 185 available to subscribers of the shared cable network link 185. In one embodiment, the message 320-2 forwarded from the message processing resource 140 to the message management application 240 indicates the specific location of the distributor (service provider).

Accordingly, in an instance in which the user 108-1 has customer premises equipment to be returned to the service provider, the message 320-2 provides notification to the user 108-1 that they are in close proximity to the specific location (business entity 480) for returning customer equipment. In a similar manner, the message 320-2 can indicate that business entity 480 is located nearby such that the user 108-1 can pick up customer premises equipment 185 for use in subscriber domain 150-1.

Figure 5:
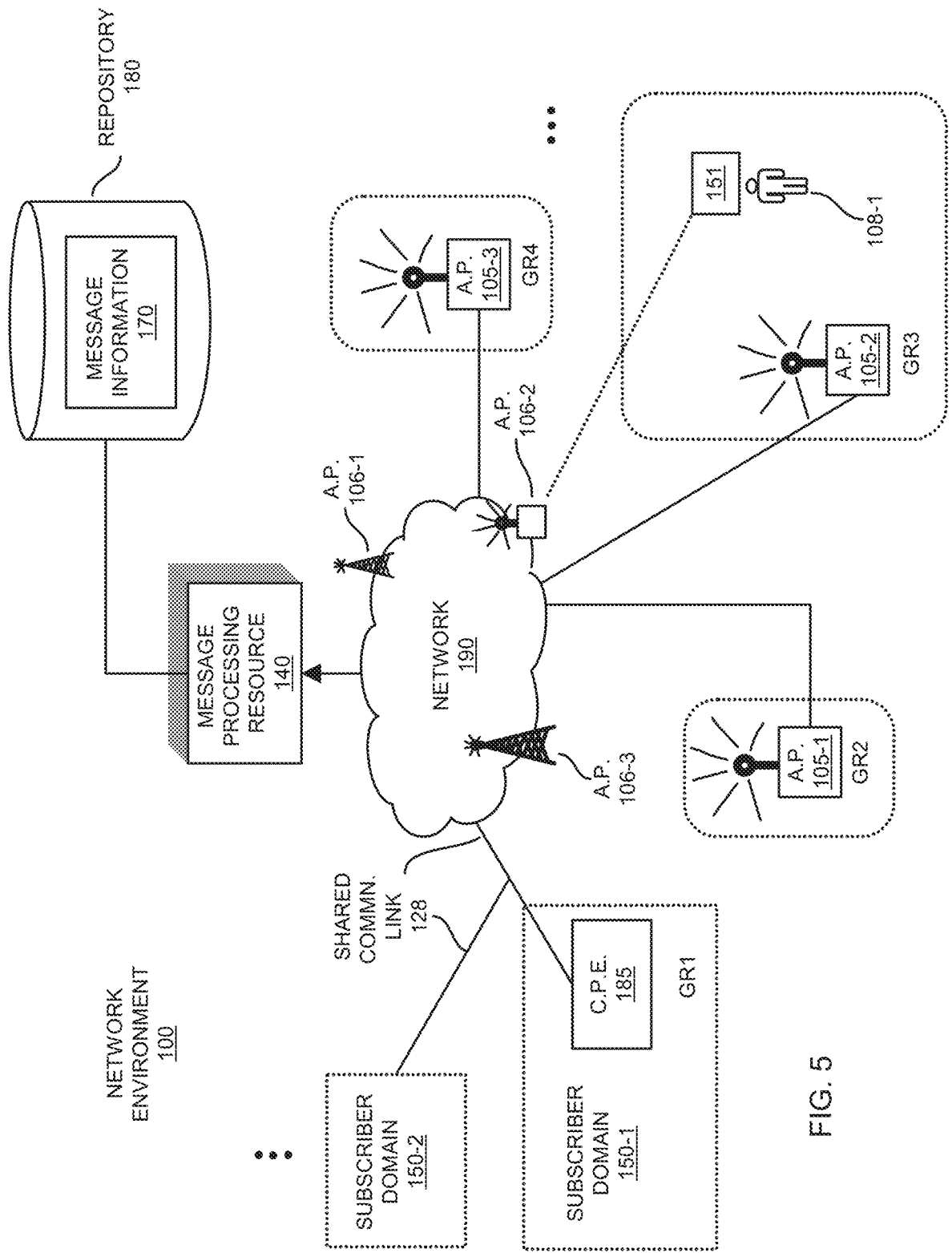
FIG. 5 is an example diagram illustrating selective delivery of messages to a mobile computer device in a third geographical location of a network environment according to embodiments herein.

FIG. 5 is an example diagram illustrating delivery of messages to a mobile computer device in a third geographical location of a network environment according to embodiments herein.

As shown in FIG. 5, the user 108-1 operating mobile communication device 120-1 has moved from location geographical region GR2 to geographical region GR3. Assume that the message management application 240 temporarily experiences a loss of connection with message-processing resource 140 during transition from geographical region GR2 to geographical region GR3.

In one embodiment, during the transition, the message management resource 240 continuously attempts to connect to any available access points in network environment 100 to communicate again with message processing resource 140. This can include sending out a probe request message and checking for availability of any WiFi™ access points that are available in the particular area GR3.

Assume in this example, that the message management application 240 detects presence of access point 106-2 (e.g., a public WiFi™ access point not provided by the cable network service to which the user 108-1 subscribes). In such an instance, message management application 240 establishes a respective wireless connection with access point 106-1 to communicate over network 190 to message-processing resource 140. After establishing the corresponding new wireless connection with access point 106-2, the message management application 240 transmits corresponding information such as location information of a current whereabouts of the mobile communication device 120-1 to message-processing resource 140. Accordingly, via communications received from the message management application 240, the message-processing resource 140 detects that the communication device 120-1 and corresponding user 108-1 are currently located in geographical region GR3. Based on processing of the communications received from the mobile communication device 120-1, the message processing resource 140 identifies that the user 108-1 is using an out of network access point to communicate with the message-processing resource 140.

In response to detecting presence of mobile communication device 120-1 in geographical region GR3, the message-processing resource 140 applies the data GR3 to geo-tag data 330 in message information to identify which if any of the messages 320 are pertinent for sending to the corresponding user 108-1 operating mobile communication device 120-1. In this instance, because geo-tag data 330-5 specifies geographical region GR3, the message processing resource 140 considers message 320-5 as a candidate for forwarding to message management application 240.

As previously discussed, message information 170 can include additional information indicating what circumstances in which message 320-5 is appropriate for forwarding to the corresponding user 108-1. For example, as previously discussed, the time tag data 340-5 can indicate that the message 320-5 is relevant for transmitting at any time. Additionally, the message information 170 can include one or more rules indicating that message 320-5 should not be forwarded to the corresponding message management application 240 unless it is detected that the mobile communication device 120-1 is currently connected to an out of network access point (e.g., an access point provided by a company other than company XYZ).

In this example embodiment, message processing resource 140 detects that the user 108-1 operating mobile communication device 120-1 uses an out of network access point 106-2 to communicate with message-processing resource 140. The message-processing resource 140 forwards message 320-5 over network 190 to message management application 240 to notify the corresponding user 108-1 that a company XYZ access point 105-2 is available in the geographical region GR3 for use by the respective mobile communication device 120-1 to connect to network 190.

Figure 6:
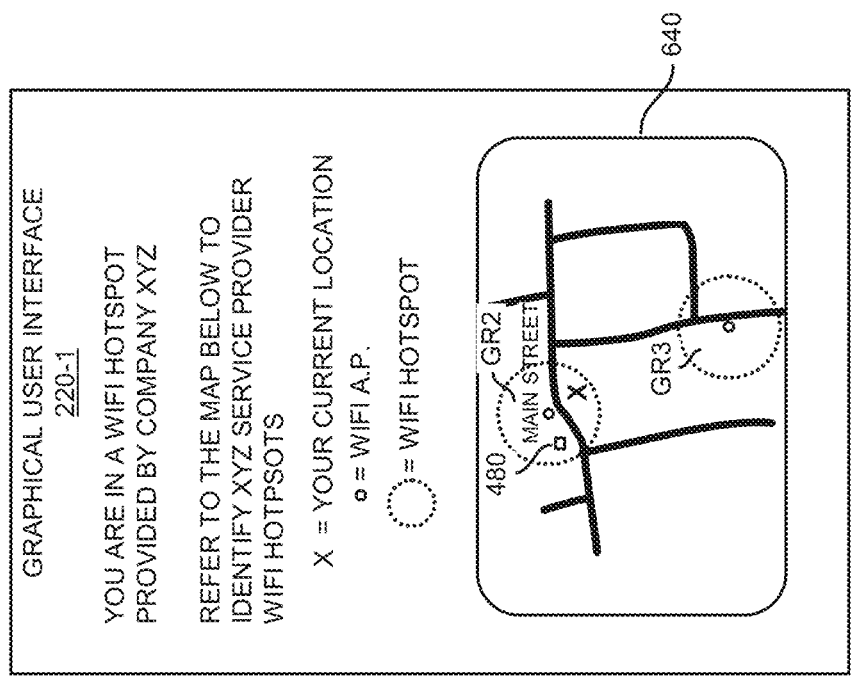
FIG. 6 is an example diagram illustrating display of a message on a display screen according to embodiments herein.

In one embodiment, receipt of message 320-5 causes the message management application 240 to display information as shown in graphical user interface 220-1 in FIG. 6. In accordance with such an embodiment, the graphical user interface 220-1 includes map 640 indicating the user's current location as well as a location of any of the company XYZ service provider's access points 105.

Accordingly, embodiments herein can include conditionally forwarding messages to a corresponding subscriber to notify them of the availability of the service provider's different access point's based on the corresponding user being located in a vicinity of an access point provided by the service provider.

FIG. 7 is an example diagram illustrating selection of message filter information according to embodiments herein.

In accordance with further embodiments, a respective user can provide input to message processing resource 140 to indicate how to filter and forward messages. For example, via presentation of the message filter information 770 displayed to the corresponding subscriber user 108-1, the user 108-1 can select (using checkmarks) different categories of what types of messages the user one or a half on one would like to receive.

Figure 8:
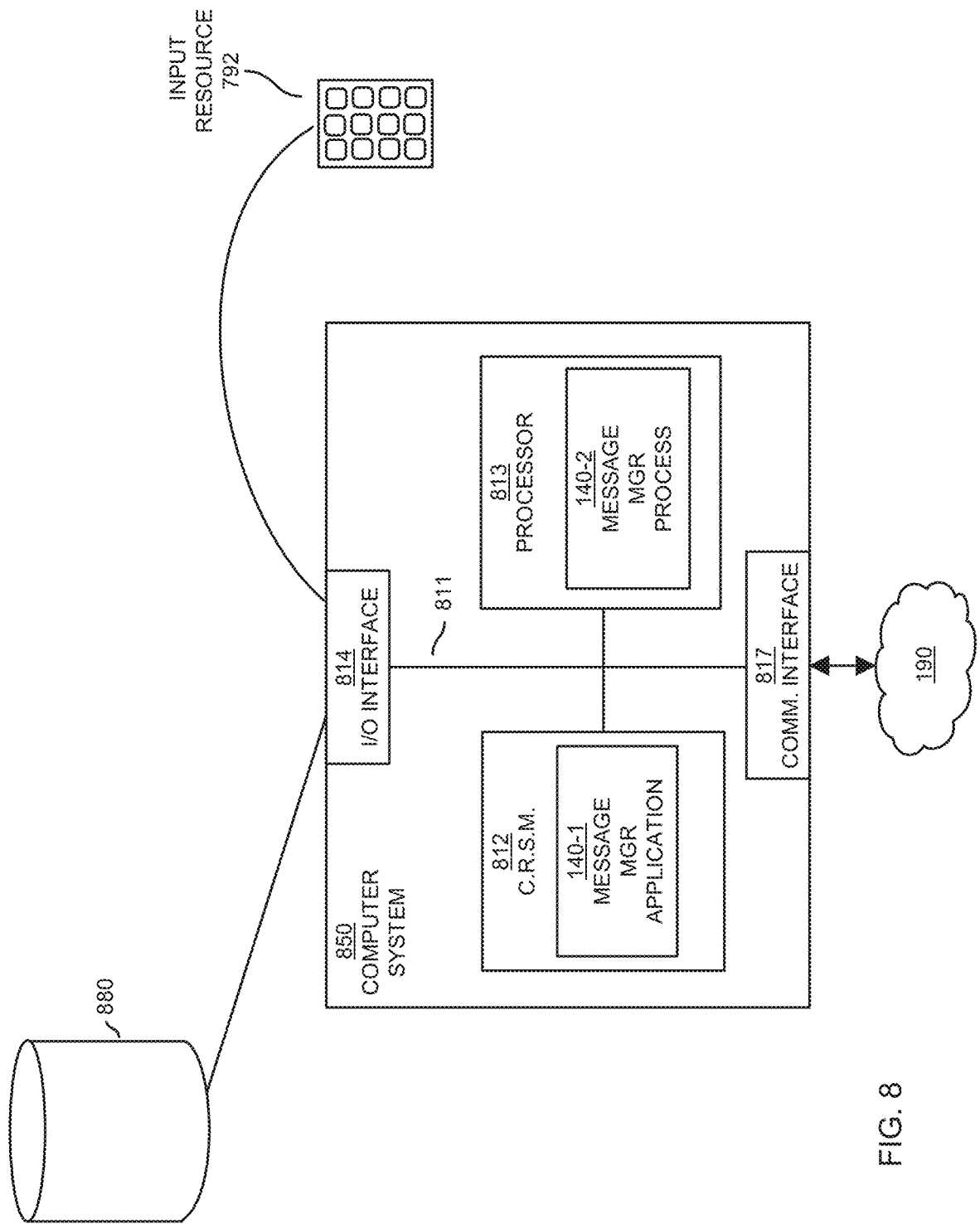
FIG. 8 is a diagram illustrating an example computer architecture in which to execute any of the functionality according to embodiments herein.

FIG. 8 is an example block diagram of a computer device for implementing any of the operations as discussed herein according to embodiments herein.

As shown, computer system 850 of the present example includes an interconnect 811, a processor 813 (such as one or more processor devices, computer processor hardware, etc.), computer readable storage medium 812 (such as hardware storage to store data), I/O interface 814, and communications interface 817.

Interconnect 811 provides connectivity amongst processor 813 (computer processor hardware), computer readable storage media 812, I/O interface 814, and communication interface 817.

I/O interface 814 provides connectivity to a repository 480 and, if present, other devices such as a playback device, display screen, input resource 792, a computer mouse, etc.

Computer readable storage medium 812 (such as a non-transitory hardware medium) can be any hardware storage resource or device such as memory, optical storage, hard drive, rotating disk, etc. In one embodiment, the computer readable storage medium 812 stores instructions executed by processor 813.

Communications interface 817 enables the computer system 850 and processor 813 to communicate over a resource such as network 190 to retrieve information from remote sources and communicate with other computers. I/O interface 814 enables processor 813 to retrieve stored information from repository 880.

As shown, computer readable storage media 812 is encoded with message manager application 140-1 (e.g., software, firmware, etc.) executed by processor 813. Message manager application 140-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in message manager application 140-1 stored on computer readable storage medium 812.

Execution of the message manager application 140-1 produces processing functionality such as message manager process 140-2 in processor 813. In other words, the message manager process 140-2 associated with processor 813 represents one or more aspects of executing message manager application 140-1 within or upon the processor 813 in the computer system 850.

Those skilled in the art will understand that the computer system 850 can include other processes and/or software and hardware components, such as an operating system that controls allocation and use of hardware resources to execute domain management application 140-1.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 may reside at any location or can be included in any suitable resource in network environment 100 to implement functionality as discussed herein.

Functionality supported by the different resources will now be discussed via flowcharts in FIGS. 9 and 10. Note that the steps in the flowcharts below can be executed in any suitable order.

Figure 9:
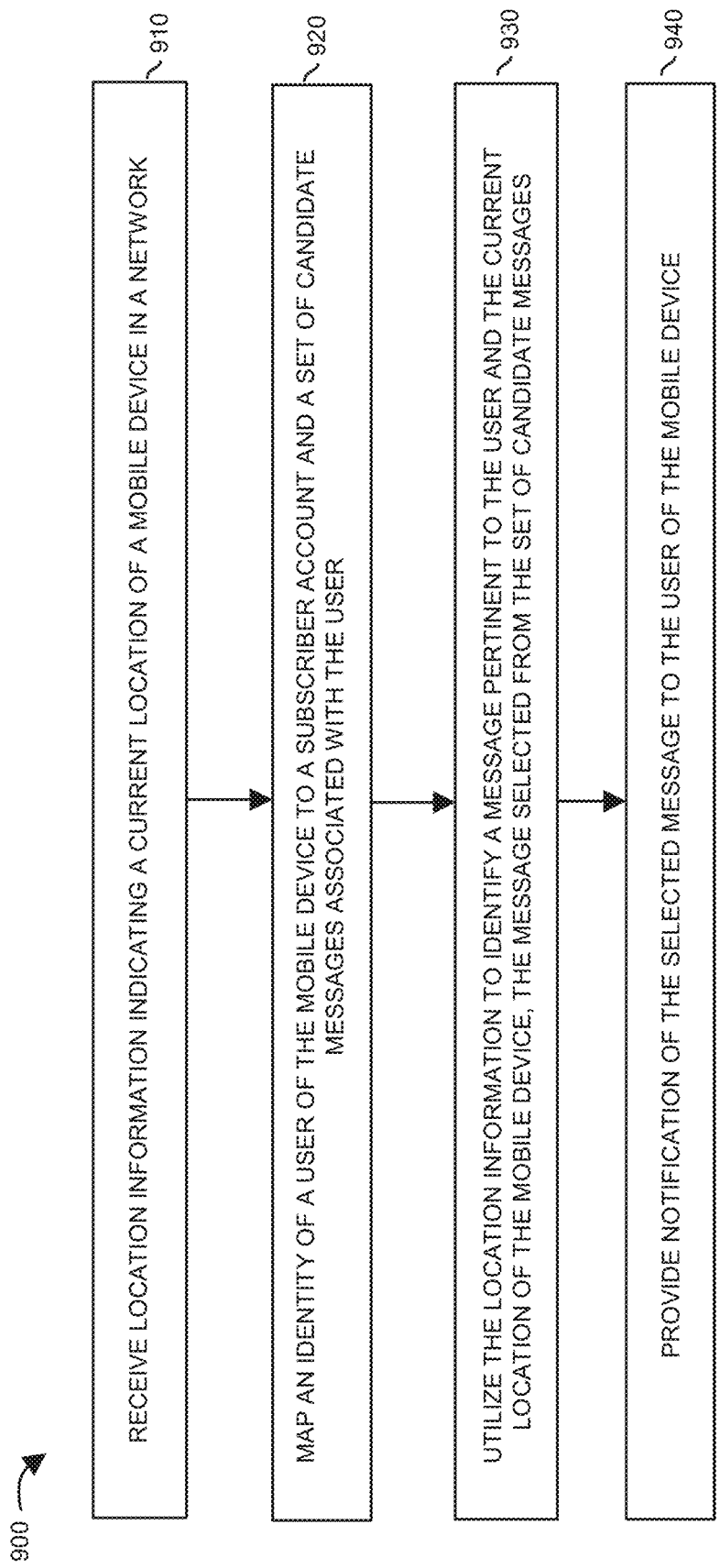
FIGS. 9 and 10 are example diagrams illustrating methods according to embodiments herein.

FIG. 9 is a flowchart 900 illustrating an example method according to embodiments. Note that there will be some overlap with respect to concepts as discussed above.

In processing block 910, the message-processing resource 140 receives location information indicating a current location of a mobile communication device 120-1 in a network 190. A user 108-1 of the mobile communication device 120-1 subscribes to use of the network 190.

In processing block 920, the message processing resource 140 maps an identity of the user 108-1 to a respective subscriber account and corresponding candidate messages 320 associated with the user 108-1.

In processing block 930, the message processing resource 140 utilizes the received location information to identify a message pertinent to the user 108-1 and the current location of the mobile communication device 120-1. The message-processing resource 140 selects one or more messages 320 for delivery to the mobile communication device 120-1.

In processing block 940, the message processing resource 140 provides notification of the selected one or more messages to the user 108-1 of the mobile communication device 120-1.

Figure 10:
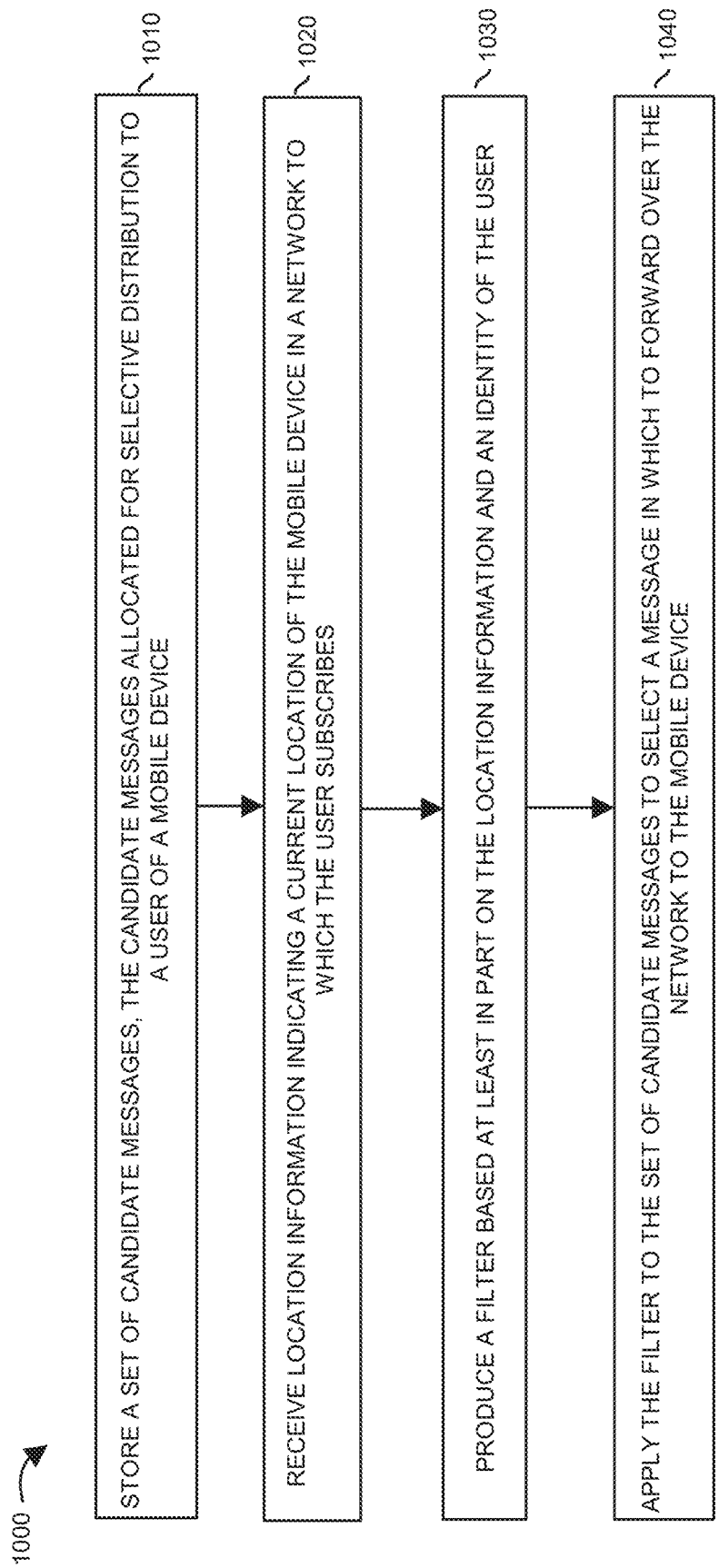

FIG. 10 is a flowchart 1000 illustrating an example method according to embodiments. Note that there will be some overlap with respect to concepts as discussed above.

In processing block 1010, the message processing resource 140 stores a set of candidate messages 320 for subscriber user 108-1. The message-processing resource 140 allocates the candidate messages 320 for selective distribution to user 108-1 of the mobile communication device 120-1.

In processing block 1020, the message processing resource 140 receives location information indicating a current location of the mobile communication device 120-1 in network 190. As previously discussed, the user 108-1 subscribes to use of network 190.

In processing block 1030, the message processing resource 140 produces a filter 360 based at least in part on the location information and an identity of the user 108-1.

In processing block 1040, the message-processing resource 140 applies the filter 360 to the set of candidate messages 320 to select one or more messages in which to forward over the network 190 to the mobile communication device 120-1.

Note again that techniques herein are well suited for use in controlling conditions in a respective subscriber domain of a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
via computer processor hardware, performing operations of:
receiving location information indicating a current location of a mobile device in a network, a user of the mobile device subscribing to use of the network;
mapping an identity of the user to a subscriber account and candidate messages stored in a buffer assigned to the user, each of the candidate messages tagged with geographical information;
applying the location information to the geographical information assigned to the candidate messages in the buffer to identify a message pertinent to the user and the current location of the mobile device, the pertinent message selected from the candidate messages; and
in response to identifying the message pertinent to the user based on the current location of the mobile device, providing notification of the pertinent message to the user of the mobile device.

2. The method as in claim 1, wherein mapping the identity of the user to the subscriber account includes:
receiving a unique network address assigned to the mobile device; and
identifying the subscriber account using the unique network address.

3. The method as in claim 1, wherein the subscriber account is a fee-based subscriber account managed by a network service provider, the network service provider providing the user access to the network at multiple access points;
wherein receiving location information indicating the current location of the mobile device operated by the user includes detecting that the mobile device operated by the user has established a connection with a particular access point in the network provided by the network service provider, the particular access point disposed at a known geographical location in the network; and
wherein providing notification of the pertinent message to the user of the mobile device includes: communicating the pertinent message over the network provided by the network service provider to the mobile device.

4. The method as in claim 1 further comprising:
detecting a time of day that the user is located at the current location; and
in addition to utilizing the location information to identify the message pertinent to the user and the current location of the mobile device, utilizing the detected time of day as an additional parameter to identify the message pertinent to the user.

5. The method as in claim 1 further comprising:
monitoring habits of the user operating the mobile device at the current location; and
utilizing habits of the user operating the mobile device as a basis to identify the message pertinent to the user of the mobile device.

6. The method as in claim 1 further comprising:
wherein utilizing the location information to identify a message pertinent to the user in the current location of the mobile device further comprises: producing the pertinent message to include a promotion of goods available from a retail entity located in a vicinity of the current location.

7. The method as in claim 1, wherein the current location is a subscriber domain in which the user resides;
wherein mapping the identity of the user to a subscriber account further includes analyzing a history of content delivered to the user in the subscriber domain; and
the method further comprising: based on the history of the delivered content, producing the pertinent message to indicate availability of newly available content for retrieval and viewing by the user in the subscriber domain.

8. The method as in claim 1, wherein the current location is a remote location with respect to a subscriber domain in which the user domiciles, the subscriber domain having access to the network via a shared cable network provided by a respective network service provider managing the network, the subscriber domain including customer premises equipment to retrieve content over the shared cable network; and
wherein utilizing the location information to identify the message pertinent to the user at the current location includes: detecting that the user is located in a vicinity of a distributor that makes the customer premises equipment available to subscribers of the shared cable network, the pertinent message indicating the location of the distributor.

9. The method as in claim 1 further comprising:
detecting movement of the mobile device into a geographical region in which the user domiciles; and
in response to detecting movement of the mobile device into the geographical region, producing the pertinent message to include a notification relevant to the geographical region.

10. The method as in claim 1, wherein receiving the location information includes: detecting that the mobile device operated by the user has established a connection with a particular access point in the network.

11. The method as in claim 1, wherein each respective candidate message of the candidate messages stored in the buffer is tagged with corresponding geographical information indicating a respective location in which the mobile device must reside for the respective candidate message to be pertinent to the user; and wherein applying the location information to the geographical information results in detecting that the pertinent message selected from the candidate messages in the buffer is tagged with an identity of a particular geographical region in which the current location resides.

12. The method as in claim 1 further comprising:
providing the notification to the user of the mobile device in response to detecting that the current location of the mobile device resides within a particular geographical region assigned to the pertinent message.

13. The method as in claim 12 further comprising:
receiving time information indicating a current time of day; and
providing notification of the pertinent message to the user in response to detecting that the current time of day falls within a range of time assigned to the pertinent message.

14. The method as in claim 12, wherein the pertinent message indicates that the mobile device is located within wireless connectivity range provided by a wireless access point available for use by the user.

15. The method as in claim 14, wherein providing notification of the pertinent message to the user of the mobile device includes:
initiating display of a map on a display screen of the mobile device to the user, the map indicating the current location of the mobile device with respect to a corresponding location of the wireless access point available for use by the user.

16. The method as in claim 1, wherein the pertinent message indicates that the mobile device is located within wireless connectivity range provided by a wireless access point available for use by the user.

17. The method as in claim 16, wherein the pertinent message indicates that the wireless access point is part of the network to which the user subscribes.

18. The method as in claim 17, wherein the pertinent message indicates a name of a service provider that provides the network to which the user subscribes.

19. The method as in claim 16, wherein providing notification of the pertinent message to the user of the mobile device includes:
initiating display of the notification on a display screen of the mobile device to the user, the notification indicating a corresponding location of the wireless access point available for use by the user.

20. The method as in claim 16, wherein providing notification of the pertinent message to the user of the mobile device includes:
initiating display of a map on a display screen of the mobile device to the user, the map indicating a corresponding location of the wireless access point available for use by the user.

21. The method as in claim 1, wherein the candidate messages are addressed for delivery to the mobile device.

22. A method comprising:
storing a set of candidate messages, the set of candidate messages allocated for selective distribution to a user of a mobile device, the candidate messages assigned and tagged with geographical region information;
receiving location information indicating a current location of the mobile device in a network to which the user subscribes;
producing a filter based at least in part on the location information and an identity of the user; and
applying the filter to the tagged geographical region information assigned to the set of candidate messages to select a message in which to forward over the network to the mobile device.

23. The method as in claim 22 further comprising:
producing tag data for each respective candidate message in the set, the tag data indicating circumstances in which to selectively forward the respective candidate message to the mobile device operated by the user; and
wherein applying the filter includes matching the location information to the tag data to select the message to forward to the mobile device.

24. The method as in claim 23, wherein producing the tag data includes:
generating first tag data to indicate geographical information; and
assigning the first tag data to the set of candidate messages, the first tag data indicating a respective geographical location to which a respective message in the set is eligible for delivery to the mobile device.

25. The method as in claim 24, wherein producing the tag data includes:
generating second tag data to indicate time information; and
assigning the second tag data to the set of candidate messages, the second tag data indicating a time range in which a respective candidate message in the set is eligible for delivery to the mobile device.

26. The method as in claim 22 further comprising:
initiating delivery of the selected message over the network to the mobile device.

27. Computer-readable hardware storage having instructions stored thereon, the instructions, when carried out by computer processor hardware, causes the computer processor hardware to perform operations of:
receiving location information indicating a current location of a mobile device in a network, a user of the mobile device subscribing to use of the network;
mapping an identity of the user to a subscriber account and candidate messages stored in a buffer assigned to the user, the candidate messages tagged with geographical information;
applying the location information to the geographical information assigned to the candidate messages in the buffer to identify a message pertinent to the user and the current location of the mobile device, the pertinent message selected from the candidate messages;
providing notification of the pertinent message to the user of the mobile device;
wherein each respective candidate message of the candidate messages stored in the buffer is tagged with corresponding geographical information indicating a respective location in which the mobile device must reside for the respective candidate message to be pertinent to the user;
wherein applying the location information to the geographical information results in detecting that the pertinent message selected from the candidate messages in the buffer is tagged with an identity of a particular geographical region in which the current location resides;

providing the notification in response to detecting that the current location of the mobile device resides within the particular geographical region; and wherein the pertinent message indicates that the mobile device is located within wireless connectivity range provided by a wireless access point available for use by the user.

* * * * *